United States Patent [19]

Nakayama

[11] Patent Number: 4,942,519
[45] Date of Patent: Jul. 17, 1990

[54] COPROCESSOR HAVING A SLAVE PROCESSOR CAPABLE OF CHECKING ADDRESS MAPPING

[75] Inventor: Takashi Nakayama, Tokyo, Japan
[73] Assignee: NEC Corporation, Tokyo, Japan
[21] Appl. No.: 947,344
[22] Filed: Dec. 29, 1986

[30] Foreign Application Priority Data

Dec. 25, 1985 [JP] Japan .................. 60-294285

[51] Int. Cl.⁵ ................. G06F 15/16; G06F 13/00
[52] U.S. Cl. ................. 364/200; 364/230.4; 364/228.6
[58] Field of Search .......... 364/132, 200 MS File, 364/900 MS File, 200, 900

[56] References Cited

U.S. PATENT DOCUMENTS

| | | | |
|---|---|---|---|
| 4,041,471 | 8/1977 | Krossa et al. | 364/200 |
| 4,099,236 | 7/1978 | Goodman et al. | 364/200 |
| 4,149,244 | 4/1979 | Anderson et al. | 364/200 |
| 4,270,167 | 5/1981 | Koehler et al. | 364/200 |
| 4,509,116 | 4/1985 | Lackey et al. | 364/200 |
| 4,547,849 | 10/1985 | Louie et al. | 364/200 |
| 4,700,292 | 10/1987 | Campanini | 364/200 |
| 4,750,110 | 6/1988 | Mothersole et al. | 364/200 |
| 4,763,242 | 8/1988 | Lee et al. | 364/200 |

OTHER PUBLICATIONS

Motorola, MC68020 32-Bit Microprocessor User's Manual, 1984, 1985, 1-2, 1-7, 8-3, 8-7.

Motorola, MC 68881 Floating-Point Coprocessor User's Manual, 1985, 1-6, 1-7, 5-2.

Primary Examiner—Gary V. Harkcom
Assistant Examiner—Michael A. Jaffe
Attorney, Agent, or Firm—Foley & Lardner, Schwartz, Jeffery, Schwaab, Mack, Blumenthal & Evans

[57] ABSTRACT

A coprocessor device having a virtual storage system comprises a master microprocessor, a slave microprocessor controlled by the master microprocessor to execute an operation designated by instructions for the slave microprocessor, a main storage for storing information and data for the master microprocessor and the slave microprocessor, and an external storage coupled to the main storage for storing information and data for the master microprocessor and/or the slave microprocessor. The master microprocessor has a circuit for detecting whether or not the memory location required by a certain instruction is physically present in the main storage. This detecting circuit operates to enable access to the main storage or to generate an interrupt to transfer information and/or data from the external storage to the main storage, in accordance with the content of the instruction. There is also provided a circuit for feedbacking to the master microprocessor the decoded instruction for the slave microprocessor which includes address which is not physically present in the main storage, so that it is processed by the detecting circuit.

19 Claims, 2 Drawing Sheets

COPROCESSOR HAVING A SLAVE PROCESSOR CAPABLE OF CHECKING ADDRESS MAPPING

BACKGROUND OF THE INVENTION

1. Field of the Invention

The present invention relates to a microprocessor device having a virtual storage system therein, more specifically to a control system for controlling a slave processor which is connected to the external part of a microprocessor to execute a portion of an instruction set.

2. Description of the related art

There exists a limit on the number of devices which can be integrated in a one-chip microprocessor composed of a large scale integrated circuit (LSI). It is, therefore, difficult for a single one-chip microprocessor to execute high level instructions such as floating point arithmetic at high speed. This is why an instruction set is classified into two kinds, each of which is executed in a master processor and a slave processor respectively.

A master processor is a processor which can operate as a central processing unit (CPU) independently of the slave processor. A slave processor is a processor which executes instructions in place of a processor under control thereof. Such a slave processor executes mainly high level instructions such as floating point arithmetic. By connecting a slave processor to a computer system in which a master processor operates as CPU, a user can expand the institution set. Intel 8086 and Intel 8087 are used as the master processor and slave processor composed of a one-chip LSI respectively.

A conventional microprocessor device comprises a master processor, a slave processor and a main storage. The master processor and the slave processor share an address/data common bus and a control bus to access the main storage. Addresses and data by which the master processor or slave processor accesses the main storage are transmitted in time division through the address/data common bus. A handshake signal line is connected between the master processor and the slave processor. The master processor, moreover, supplies an instruction decode condition signal to the slave processor so that instructions can be decoded simultaneously in both processors.

Instruction sets executed by the above microprocessor system are classified into instructions for the master processor and instructions for the slave processor.

Instructions for the master processor are the instructions by which the processor executes operation and accesses the main storage The slave processor supervises the address/data common bus and the control bus, and fetches instructions simultaneously with the master processor. The slave processor, furthermore, decodes the instructions for the master processor simultaneously with the master processor, in response to the decode condition signal from the master processor. The slave processor, however, does not execute the operation.

Instructions for the slave processor are the instructions by which the slave processor executes operation. The master processor deals with a group of instructions for the slave processor as a single instruction (hereinafter referred to as "ESC instruction"). The slave processor supervises the address/data common bus and the control bus, and fetches instructions simultaneously with the master processor. The slave processor, furthermore, decodes the instructions for the slave processor simultaneously with the master processor in response to the decode condition signal and executes the same.

Operation of the master processor and the slave processor with the instructions for slave processor depends on the presence of memory operand and on whether the memory operand is to be read or written.

(1) In case the memory operand exists:

The master processor does not execute the instructions. The slave processor executes the operation designated by the instruction for the internal register operand. (2) In case there exists memory operand The master processor calculated the operand address and drives the bus cycle to read one word of a first address (for example 16 bits) out of the main storage. The slave processor supervises the address/data common bus and the control bus, and reads the first address of the operand and data by one word and stores them when the master processor drives the read bus cycle. The operation of the slave processor thereafter is classified into three cases depending on the reading and writing conditions.

(2-1) In the case of reading the memory operand of one word:

The slave processor executes the operation designated by the instruction for the memory operand of one word read in and the internal register operand if necessary, and stores the operation result in the internal register.

(2-2) In the case of reading the memory operand of more than two words:

The slave processor obtains the right to use the address/data bus and the control bus from the master processor in response to the handshake signal. The slave processor drives the read bus cycle by itself to read the remainder of the memory operand. Then the slave processor executes the operation designated by the instruction for the read out memory operand and the internal register operand if necessary, and stores the operation result in the internal register.

(2-3) In the case of writing to the memory operand:

The slave processor executes the operation designated by the instruction for the internal register operand. Then the slave processor obtains the right to use the address/data bus and the control bus from the master processor in response to the signal, and writes the operation result to the memory operand.

The above-mentioned conventional microprocessor system does not support the virtual storage. As a microprocessor becomes of higher performance, demand for the virtual storage which provides virtually bulk storage by using the external storage besides the main storage of the limited memory is raised, especially the virtual storage of paging method.

In the Virtue storage of the paging method, the address space which the programmer imagines (virtual address space) is divided into of several thousand bytes, and the address space is mapped to the address space of the main storage (real address space) page after page. The page which is mapped to the real address space is a portion of all the pages in the virtual space, and the remainder is undefined or exists in an external storage. In the virtual storage of the paging method, memory is protected by adding an attribute indicating whether reading out of or writing to the storage can be or cannot be executed to every page.

In a microprocessor supporting the virtual storage of the paging method, the following three checks are thus required in case of accessing the memory operand.

(I) Paging over check

In the paging over check, a check is made as to whether the memory operand is included in a single page, or included over two successive pages. In case the memory operand is included over two successive pages (paging over), address mapping check and memory protect check described hereinafter are carried out on the second page as well. In carrying out the paging over check, information is required on the first address and the data length of the memory operand.

(II) Address mapping check

In the address mapping check, a check is made as to whether the page indicated by the virtual address exists in the main storage (real address space) or in the external storage after the address mapping from the virtual address to the real address is executed. In carrying out the address mapping check, information is required on the virtual address of the page including the memory operand.

(III) Memory protect check

In the memory protect check, a check is made as to whether or not it is allowed to access the including the memory operand. In carrying out the memory protect check, information is required on the virtual address of the page including the memory operand and on whether reading or writing takes place for the memory operand.

To utilize the property of software executed by the master processor and slave processor which do not support the virtual storage effectively, the master processor and slave processor supporting the virtual storage have to be able to execute the same instruction set as the conventional one. In forming a master processor in which the above address mapping system and memory protect system are incorporated in a LSI chip in order to support the virtual storage of paging method, the conventional control system has the following disadvantages and cannot control the slave processor in a right way.

Disadvantage 1

It is necessary for the master processor to recognize whether the memory operand is to be read or written in order to execute the memory protect check using a memory protect system incorporated in the master processor. In case of executing instructions for the slave processor by the conventional system, the slave processor can judge whether the memory operand is to be read or written through decoding, but the master processor does not decode such instructions and thus cannot execute the memory protection check.

Disadvantage 2

To carry out the paging over check for the memory operand, information is required not only on the first virtual address of the operand but also on the data length of the operand. In case of executing instructions for the slave processor by the conventional system, the master processor cannot execute the paging over check because the master processor cannot recognize the data length of the memory operand. On the contrary, the slave processor can execute the paging over check but does not have means for executing the address mapping check and memory protect check on the second page making use of the address mapping system and the memory protect system inside the master processor in case the memory operand is included over two successive pages.

Disadvantage 3

Once it is clarified that the memory operand does not exist in the main storage, but in the external storage through the address mapping check executed, the master processor stops execution of the instruction and transmits the page including the memory operand from the external storage to the main storage. Then the master processor has to execute again the instruction stOpped on the way. The slave processor has, however, already started execution of instructions for the slave processor just after the master processor finishes decoding ESC instructions in the conventional system. It is not, therefore, possible to carry out the correct address mapping check.

The above disadvantages are all concerned about the virtual storage, but there still exist some other disadvantages.

Disadvantage 4

In the case of using a master processor having an address bus and a data bus independent to each other instead of a common bus transmitting addresses and data in time division, the number of the external pins Of the slave processor LSI increases because an address bus and a data bus are provided independently to each other in the slave processor as well.

Disadvantage 5

As mentioned above, the slave processor supervises the address/data common bus and control bus, and executes instruction fetching and instruction decoding simultaneously with the master processor. It is, however, necessary to supply instruction decode condition signals to the slave processor, in the master processor in which the multistage pipelining is executed The number of the external pins, therefore, increases furthermore both in the master processor LSI and the slave processor LSI.

SUMMARY OF THE INVENTION

The present invention has an object to provide a microprocessor device which has dissolved the above-mentioned drawbacks of the conventional microprocessor device.

Accordingly, it is an object of the present invention to provide a microprocessor device in which a master processor can execute a memory protection check.

Another object of the present invention is to provide a microprocessor in which a master processor can execute a paging over check and a slave processor can execute a address mapping check and protection check on the second page in case of paging over.

Still another object of the present invention is to provide a microprocessor device in which a slave processor can execute address mapping check properly even after the slave processor starts to execute instructions for the slave processor.

Still another object of the present invention is to provide a microprocessor device in which a master processor LSI and a slave processor LSI have a small number of the external pins.

According to the present invention, there is provided a control system for a microprocessor device, said microprocessor device including a first microprocessor, a second microprocessor being controlled by the first microprocessor to execute the operation of a portion of instruction sets, a main storage for storing information and data for the first microprocessor and the second microprocessor, an external storage associated to the main storage for storing information and data for the first microprocessor and/or the second microprocessor, and a bus coupling the first microprocessor, the second microprocessor and the main storage to each other so as to transfer data and information to each other;

the first microprocessor including a bus unit for controlling the status of the bus with respect to the second microprocessor, the main storage and the external storage, an instruction decoder for decoding instructions for the first microprocessor and an operation execution unit for executing instructions for the first microprocessor with data and/or information stored in the memory location indicated by the instruction;

the second microprocessor including an instruction decoder for decoding the instructions for the second microprocessor and an operation execution unit for executing the same with data and/or information store in the memory location indicated by the instruction;

the control system comprising means for detecting whether or not the memory location required by a certain instruction is physically present in the main storage, said detecting means being mounted in the first microprocessor and associated to the bus control unit for enabling access to the main storage or for generating an interrupt to transfer information data from the external storage to the main storage, in accordance with the content of the instruction; and means for feedbacking to the first microprocessor the decoded instruction for the second microprocessor which includes address which is not physically present in the main storage, so as to be processed by the detecting means.

According to an preferred embodiment of the present invention, the whole memory locations of the main storage and the external storage are mapped into a virtual memory of the paging method, and the instructions are assigned with a virtual address.

According to an embodiment of the present invention, the detecting means comprises:

an effective address calculation unit coupled to the bus control unit and for calculating the effective address of the memory location required by the instruction and executing the paging over check;

a store management unit coupled to the effective address calculation unit and for mapping the memory location required by the instruction into physicl address in the main memory or I/O address.

The control system of the present invention may comprise an address decoder coupled between the bus control unit and the second microprocessor and for generating a select signals in response to the status of the signal outputted from the bus control unit.

According to embodiment present invention, the address decoder is adapted to receive from the bus control unit a signal indicating the effective address of the main storage or I/O address and to output a select signal in response to the I/O address.

On the other hand, the feedbacking means may include:

a command port coupled to the bus and operative to read instructions for the second microprocessor out of the bus in response to a control signal given by the first microprocessor, so that the instruction decoder of the second microprocessor being adapted to receive the output of the command port and operative to decode only the instructions for the second microprocessor; and a feedback port being coupled to the instruction decoder of the second microprocessor to receive the decoded instructions for the second microprocessor, and operative to store the information out of the instruction decoder temporarily and feedback the stored information to the first microprocessor in response to a control signal given by the first microprocessor.

The feedback means may further include:

a decoder being coupled to the address decoder and operative to decode the select signal and output a control signals for controlling the second microprocessor and the feedback means. Such control signals outputted from the decoder may include:

a starting signal to an operation execution unit of the second microprocessor;

a read control signal to the feedback port; and a write control signal to the command port.

According to a embodiment of the present invention, the first microprocessor is composed of a one-chip large scale integrated circuit in which the detecting means is incorporated.

The second microprocessor is preferably composed of a one-chip large scale integrated circuit in which the feedback means is incorporated.

According to the present invention, there is also provided a microprocessor device having a virtual storage system and comprising:

a master microprocessor including a bus control unit for controlling the status of a bus, an instruction decoder for decoding instructions for the master microprocessor and an operation execution unit for executing operation designated by the instructions for the master microprocessor with data and/or information stored in the memory location indicated by said instructions;

a slave microprocessor being controlled by the master microprocessor to execute the operation designated by instructions for the slave microprocessor, and including an instruction decoder for decoding the instructions for the slave microprocessor and an operation execution unit for executing the operation designated thereby with data and/or information stored in the memory location indicated by said instructions for the slave microprocessor;

a main storage for storing information and data for the master microprocessor and the slave microprocessor;

an external storage associated to the main storage for storing information and data for the master microprocessor and/or the slave microprocessor; and a bus coupling the master microprocessor, the slave microprocessor and the main storage to each other so as to transfer data and information to each other;

the microprocessor device further comprising:

means for detecting whether or not the memory location required by a certain instruction is physically present in the main storage, said detecting means being mounted in the master microprocessor and associated to the bus control unit for enabling access to the main storage or for generating an interrupt to transfer information and/or data from the external storage to the main storage, in accordance with the content of the instruction; and means for feedbacking to the master microprocessor the decoded instruction for the slave microprocessor which includes address which is not physically present in the main storage, so as to be processed by the detecting means.

The above and other objects, features and advantages of the present invention will be apparent from the following description of preferred embodiment of the invention with reference to the accompanying drawings

DESCRIPTION OF THE PREFERRED EMBODIMENT

Figure 1:
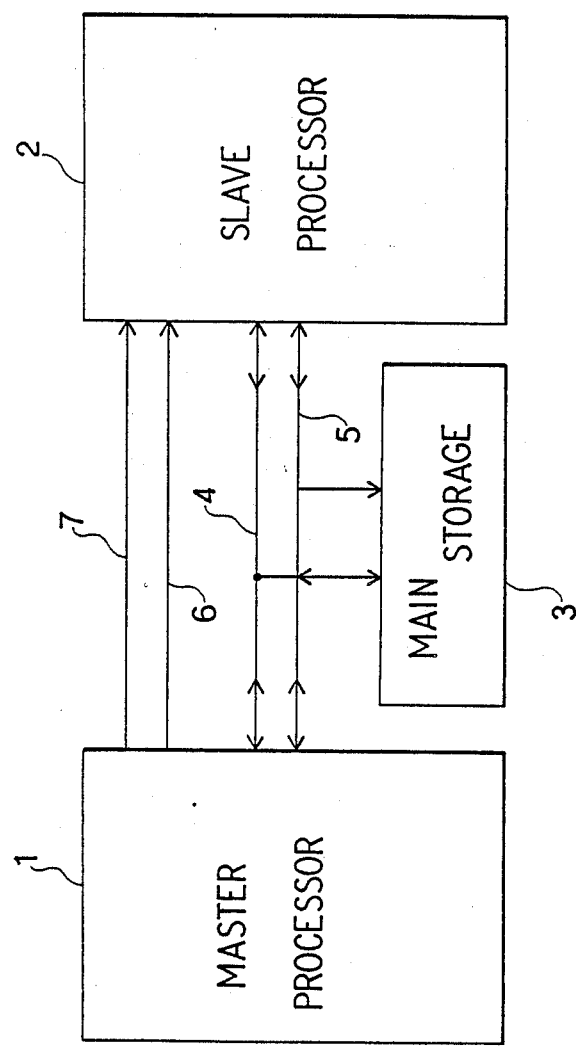
FIG. 1 is a block diagram of a conventional microprocessor device.

Referring to FIG. 1, a conventional microprocessor device will be explained.

The microprocessor device shown in FIG. 1 comprises a master processor 1, a slave processor 2 and a main storage 3, which are coupled to each other by address/data common bus 4 and a control bus 5. Addresses and data by which the master processor 1 or the slave processor 2 accesses the main storage 3 are transmitted in time division through the address/data common bus 4. A handshake signal line 6 is connected between the master processor 1 and the slave processor 2 so that the slave processor 2 operates in response to the handshake signal. The master processor 1, moreover, supplies an instruction decode condition signal 7 to the slave processor 2 so that instructions can be decoded simultaneously in both processors.

The microprocessor system executes an instruction set including instructions for the master processor and instructions for the slave processor.

Instructions for the master processor are the instructions by which the master processor 1 executes operation and accesses to the main storage 3. The slave processor 2 supervises the address/data common bus 4 and the control bus 5, and fetches instructions simultaneously with the master processor 1. The slave processor 2, furthermore, decodes the instructions for the master processor simultaneously with the master processor 1 in response to the decode condition signal 7 from the master processor. For these instructions, however, the slave processor 2 does not execute operation.

Instructions for the slave processor are the instructions by which the slave 2 executes operation. The master processor 1 deals with a group of instructions for slave processor as "ESC instruction". The slave processor 2 supervises the address/data common bus 4 and the control bus 5, and fetches instructions simultaneously with the master processor 1. The slave processor 2, furthermore, decodes and executes instructions for the slave processor in response to the handshake signal 6.

Figure 2:
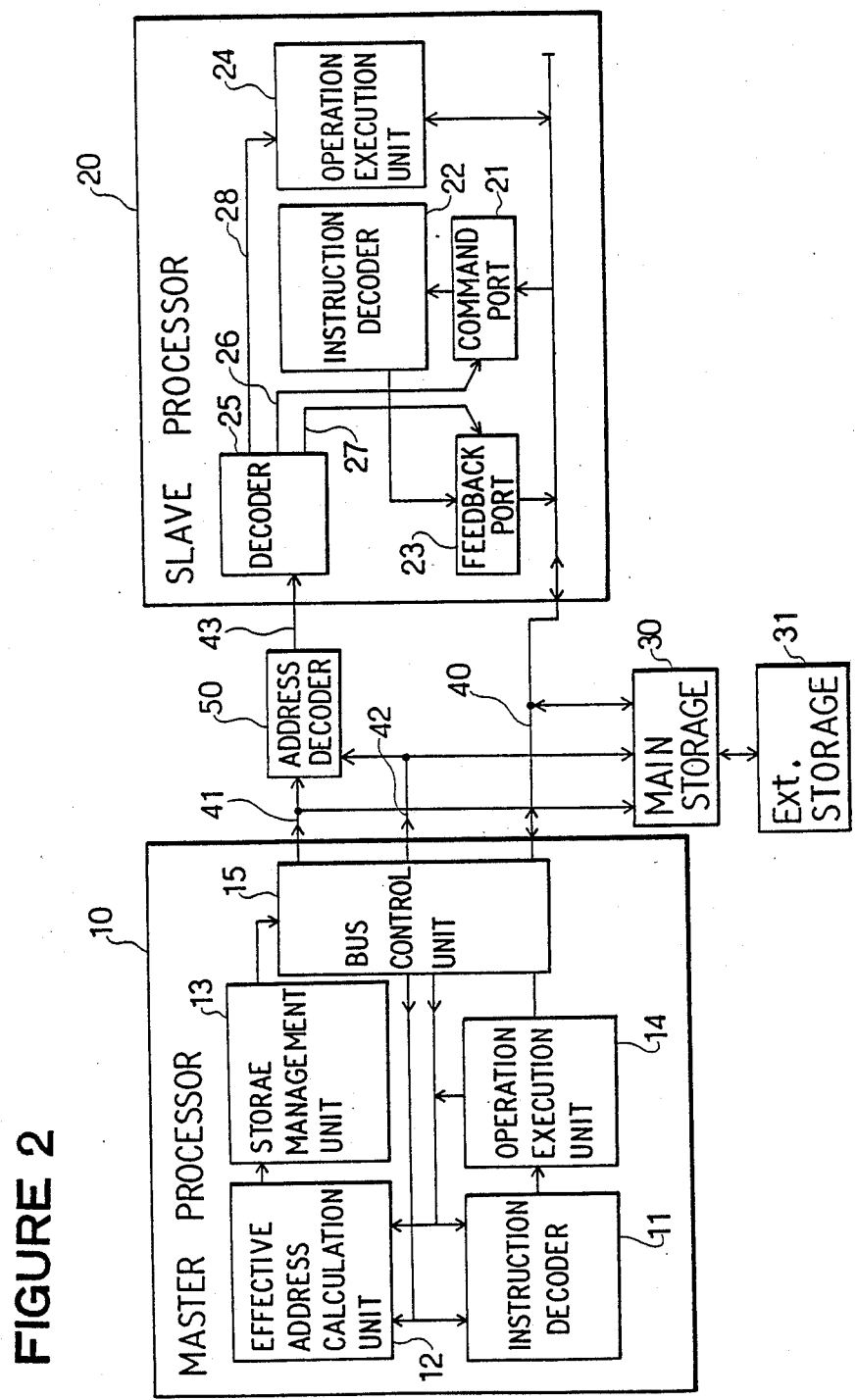
FIG. 2 is a block diagram of a control system for a microprocessor device in accordance with the present invention.

Turning to FIG. 2, there is shown a microprocessor device in accordance with the present invention.

The microprocessor device shown in FIG. 2 comprises a master processor 10 including hardware for supporting the virtual storage and a slave processor 20 which is controlled by the master processor 10. Both processors 10 and 20 are composed of one-chip LSI and execute high level operations jointly with one another. The microprocessor device further includes a main storage 30 which stores programs and data for the master processor 10 and the slave processor 20. An external storage 31 is provided and associated to the main storage 30. The main storage 30 is necessarily accessed by the master processor 10. The microprocessor device further includes an address decoder 50 which executes I/O mapping of the slave processor 20 to the master processor 10 so that data and status information are transferred to the slave processor 20.

The master processor 10 includes an instruction decoder 11. The instruction decoder 11 is coupled to an effective address calculation unit 12 which receives the output of the instruction decoder 11 and executes address calculation therefrom. The effective address calculation unit 12 is coupled to a storage management unit 13. The storage management unit 13 the virtual address from the effective address calculation unit 12 and executes mapping thereof to the real address and simultaneously executes the memory protection check. The storage management unit 13 thus supports the virtual storage of the paging method. The instruction decoder 11 is coupled also to an operation execution unit 14. The operation execution unit 14 executes the operation designated by the instruction for the master processor. The storage control unit 13 is coupled to a bus control unit 15. The bus control unit 15 drives an address bus 41 and a control bus 42, and executes sending data to and receiving data from the slave processor 20 or the main storage 30 through a data bus 40.

Thus the data bus 40 is shared by the master processor 10 and the slave processor 20 to access the main storage 30. The address bus 41 couples bus control unit 15 with an address decoder 50, and transmits the real address or the I/O address to the address decoder 50. The control bus 42 couples the bus control unit 15, the main storage 30 and the address decoder 50 to each other. The control bus 42 transmits information indicating the data sender and the data receiver on the data bus 40 and information indicating the timing of the bus cycle. The address decoder 50 outputs a select signal 43 to the slave processor 20 in response to the control bus signal.

The slave processor 20 includes a decoder 25 which receives the select signal 43 and decodes the same. The decoder 25 outputs at least a write control signal 26 to the command port 21, a read control signal 27 to the feedback port 23 and a starting signal 28 to the operation execution unit 24.

The slave processor 20 includes a command port 21. The command port 21 is coupled to the data bus 40 so that instructions for the slave processor are written to the command port 21 under the instruction of the master processor 10 as described hereinafter. The command port 21 is associated to an instruction decoder 22. The instruction decoder 22 is an executive instruction decoder for instructions for slave processor. The instruction decoder 22 is coupled to an feedback port 23 to output the decoded instruction. The feedback port 23 temporarily stores the information indicating the data length of the memory operand outputted by the instruction decoder 22 and the information on reading or writing. The feedback port 23 is coupled to the data bus 40 so that the stored information is transmitted to the master processor 10 through the data bus 40. The instruction decoder 22 is also coupled to an operation execution unit 24 to output the decoded instruction thereto. The operation execution unit 24 is coupled to the data bus 40 and executes instructions for the slave processor.

The processing process for executing instructions for the master processor and for slave will be described hereinafter with reference to FIG. 1.

(a) Execution of instructions for the master processor

The instruction for the master processor read out of the main storage 30 is decoded by the instruction decoder 11 in the master processor 10. The operation is executed by the operation execution unit 14. In case a memory operand is included in the instruction, the virtual address is calculated by the effective address calculation unit 12 and the calculated virtual address is mapped to the real address by the storage management 13. The real address is outputted and transmitted to the main storage 30 through the bus control unit 15, Thus sending and receiving operand is exchanged between the operation execution unit 14 and the main storage 30 to execute the instruction. The paging over check is executed by the effective address calculation unit 12 simultaneously with execution of the virtual address calculation. On the other hand, address mapping check and memory protection check are executed by the storage management unit 13 simultaneously with execution of mapping to the real address. In this case, the above checks are executed on the second page if the memory operand is included over two successive pages. Thus executing of address mapping check and memory protection check clarifies whether or not it is possible to access the main storage. Read/write to the main storage can be executed if it is possible to access the main storage. If it is not possible to access the main storage, no operation is executed in the operation execution unit 14 and the internal interruption (exception) occurs in the master processor 10. If the page including the memory operand exists in an external storage (not shown in the drawings), the page is transmitted to the main storage by the exception processing program. Then the instruction decoding operation on the instruction concerned about the above exception will be executed again. During this period, the slave processor 20 starts no processing at all because the select signal 43 of the slave processor 20 is not effective.

(b) Instruction for the slave processor

The master processor 10 deals with a group of instructions defined as instructions for the slave processor as a single instruction (ESC instruction). If the instruction decoder 11 of the master processor 10 finds the given instruction the ESC instruction by decoding, the operation execution unit 14 controls the bus control unit 15 to write an instruction code of the ESC instruction to the I/O address in which the command port of the slave processor 20 is mapped. The select signal 43 from the address decoder 50 and the command port write control signal 26 from the decoder 25 are turned active, and then the instruction code on the data bus 40 is written tO the command port 21 and the instruction decoder 22 decodes the instruction for the slave processor. The operation execution unit 24 of the slave processor 20, however, has not started its execution yet at this point of time.

The processing of the master processor 10 and the slave processor 20 after the above-mentioned processing depends on the presence of the memory operand.

(b-1) In case no memory operand exists:

In the master processor 10, the operation execution unit 14 controls the bus control unit 15 to drive I/O bus cycle. As a result, the starting signal 28 of the operation execution unit 24 becomes active. The operation execution unit 24 starts execution in response to the active starting signal 28 with the internal register operand thereof (b-2) In case a memory operand exists:

The operation execution unit 14 controls the bus control unit 15 so that the master processor 10 reads out the I/O address to which the feedback port 23 is mapped. Thus the master processor 10 recognizes the data length of the memory operand and whether the memory operand is to be read or written. The virtual address calculation and paging over check are executed by the effective address calculation unit 12. Address mapping check and memory protection check (on the second page as well in case of paging over) are executed by the storage management unit 13. In case the memory operand exists in the main storage and it is possible to access the memory operand, the master processor 10 drives the I/O bus cycle again and the starting signal 28 of the operation execution unit 24 is turned active.

In case the page including the memory operand exists in the external storage, the master processor 10 executes an exception to transmit the page to the main storage from the external storage. The operation execution unit 24 of the slave processor 20, however, has not yet started the operation because the starting signal 28 remains inactive. The instruction for slave processor thus can be executed again in a right way.

The processing of the master processor 10 and the slave processor 20 after the above processing is classified into two forms.

(b-2-1) In the case of reading the memory operand

The master processor 10 drives the bus cycle in which the memory operand is transmitted from the main storage 30 to the slave processor 20. The operation execution unit 24 of the slave processor 20 starts the operation in response to the starting signal 28 The operation execution unit 24 executes the operation designated by the instruction with the memory operand read out and if necessary the internal register operand thereof, and stores the operation result in the internal register.

(b-2-2) In the case of writing to the memory operand

The Operation execution unit 24 of the slave processor 20 executes the operation designated by the instruction with the internal register operand in response to the starting signal 28. The master processor 10 drives the bus cycle in which the operation result is transmitted from the slave processor 20 to the main storage 30.

As above described, the control system for the microprocessor device according to the present invention comprises, means for feedbacking the of the instruction decoder of the slave processor to the master processor; and means for controlling the start of instruction decoding of the slave processor and the start of the operation executing respectively by the master processor. On this viewpoint, the microprocessor device has the following three advantages. (1) The virtual storage can be supported with instructions for slave processor in the master processor including the virtual storage of the paging method.

(2) The scale of the instruction decoder in the master processor and the slave processor becomes smaller. It is not necessary to decode the data length of the memory operand and whether the memory operand is to be read or written because the master processor can deal with a group of instructions for slave processor as a single instruction. On the other hand, it is not necessary to decode instructions for master processor in the slave processor.

(3) The slave processor capable of executing different groups of instructions can be associated to the master processor. It is possible to define the data length of the memory operand and the read/write condition in the slave processor, if the instructions are conformed to the instruction format as the group of instructions for the slave processor.

In the microprocessOr device of the present invention, the slave processor operates under control of the master processor only and does not execute data transmitting. The following two advantages are obtained from the above feature of the device.

(4) The number of the external pins of the master processor LSI and the slave processor LSI can be decreased.

Since the decode condition is not required in the master processor, the number of the external pins for the address bus is decreased to a great extent in the slave processor.

(5) The scale of the hardware of the slave processor can be made smaller.

The slave processor needs not drive the address bus and the control bus, and does not execute the instruction fetching and instruction decoding simultaneously with the master processor.

The invention has thus been shown and described with reference to the specific embodiments. It should be, however, noted that the invention is in no way limited to the details of the illustrated structures but changes and modifications may be within the scope of the appended claims.

I claim:

1. A control system for a microprocessor device, said microprocessor device comprising:
    a first microprocessor, a second microprocessor controlled by said first microprocessor to execute an operation of a portion of instruction sets,
    a main storage for storing programs and data for said first microprocessor and said second microprocessor,
    an external storage coupled to said main storage for storing programs and data for said first microprocessor and said second microprocessor, and
    a bus coupling said first microprocessor, said second microprocessor and said main storage to each other so as to transfer data and instructions to each other, said instructions including instructions for said first microprocessor and instructions for said second microprocessor;
    said first microprocessor including a bus control unit for controlling a status of said bus with respect to said second microprocessor, said main storage and said external storage, a first instruction decoder for decoding an instruction for said first microprocessor into a first decoded instruction and a first operation execution unit for executing said first decoded instruction for said first microprocessor with data stored in a memory location indicated by said first decoded instruction for said first microprocessor;
    said second microprocessor including a second instruction decoder for decoding an instruction for said second microprocessor into a second decoded instruction for said second microprocessor and a second operation execution unit for executing said second decoded instruction for said second microprocessor with data stored in a memory location indicated by said second decoded instruction; and wherein
    all memory locations of said main storage and said external storage being mapped into a virtual memory with a paging method, and instructions being assigned with virtual addresses,
    said control system comprising:
    feedback means provided in said second microprocessor and including a feedback port responding to a command from said first microprocessor for temporarily holding said second decoded instruction for said second microprocessor including an address required for virtual memory management by said first microprocessor; and
    means provided in said first microprocessor for reading a content of said feedback port for detecting whether or not a memory location required by said second decoded instruction for said second microprocessor is physically present in said main storage, said detecting means being coupled with said bus control unit for enabling access to said main storage and generating an input/output bus cycle signal for allowance of instruction execution of said second microprocessor when said memory location required by said second decoded instruction for said second microprocessor is physically present in said main storage and can be accessed, said detecting means operating to generate an interrupt to transfer programs and data from said external storage to said main storage when said memory location required by said second decoded instruction is physically present in said main storage, and thereafter to generate said input/output bus cycle signal for allowance of instruction execution of said second microprocessor,
    said feedback means also including a third decoder receiving said input/output bus cycle signal for allowance of instruction execution of said second microprocessor for generating an internal start signal to said second operation execution unit of said second microprocessor so that said second operation execution unit of said second microprocessor starts its instruction execution only after said start signal is generated.

2. A control system as claimed in claim 1, wherein said detecting means comprises:
    an effective address calculation unit coupled to said bus control unit and for calculating an effective address of a memory location required by a given instruction and executing a paging over check;
    a memory management unit coupled to said effective address calculation unit and for mapping said memory location required by said given instruction into an address in said main memory or an I/O address.

3. A control system as claimed in claim 1, further comprising an address decoder provided externally of said first and second microprocessors and coupled between said bus control unit and said second microprocessor and for generating a select signal in response to a status of a signal outputted from said bus control unit.

4. A control system as claimed in claim 3 wherein said address decoder is configured to receive from said bus control unit a signal indicating an effective address of said main storage or an I/O address and output a select signal to said second microprocessor in response to said I/O address.

5. A control system as claimed in claim 1, wherein said feedback means includes a command port coupled to said bus and operative to read said instructions for said second microprocessor out of said bus in response to a control signal given by said first microprocessor, so that said second instruction decoder of said second microprocessor operates to receive an output from said command port and to decode only said instructions for said second microprocessor; wherein said feedback port is coupled to said second instruction decoder of said second microprocessor to receive said second decoded instruction for said second microprocessor from said instruction decoder for said second microprocessor, and operative to store an output of said second instruction decoder temporarily and feedback said stored output of said second instruction decoder to said first microprocessor in response to a control signal given by said first microprocessor.

6. A control system as claimed in claim 5, wherein said third decoder of said feedback means is coupled to said address decoder and operative to decode a select signal and output control signals for controlling said second microprocessor and said feedback means.

7. A control system as claimed in claim 5, wherein said control signals outputted from said third decoder include:

said internal start signal to said second operation execution unit for said second microprocessor;
a read control signal to said feedback port; and
a write control signal to said command port.

8. A control system as claimed in claim 1 wherein said first microprocessor is composed of a one-chip large scale integrated circuit in which said detecting means is incorporated.

9. A control system as claimed in claim 1 wherein said second microprocessor is composed of a one-chip large scale integrated circuit in which said feedback means is incorporated.

10. A microprocessor device having a virtual storage system and comprising:

a master microprocessor including a bus control unit for controlling a status of a bus, a first instruction decoder for decoding an instruction for said master microprocessor into a first decoded instruction for said master microprocessor and a first operation execution unit for executing an operation designated by said first decoded instruction for said master microprocessor with data stored in a memory location indicated by said first decoded instruction for said master microprocessor;

a slave microprocessor being controlled by said master microprocessor to execute an operation designated by instructions for said slave microprocessor, and including a second instruction decoder for decoding an instruction for said slave microprocessor into a second decoded instruction for said slave microprocessor and a second operation execution unit for executing an operation designated thereby with data stored in a memory location indicated by said second decoded instruction for said slave microprocessor;

a main storage for storing programs and data for said master microprocessor and said slave microprocessor;

an external storage coupled with said main storage for storing programs and data for said master microprocessor and said slave microprocessor; and a bus coupling said master microprocessor, said slave microprocessor and said main storage to each other so as to transfer programs and data to each other;

said microprocessor device further comprising:

feedback means provided in said slave microprocessor and including a feedback port responding to a command from said master microprocessor for temporarily holding said second decoded instruction for said slave microprocessor including an address required for virtual memory management by said master microprocessor; and means provided in said master microprocessor for reading a content of said feedback port for detecting whether or not a memory location required by said second decoded instruction for said slave microprocessor is physically present in said main storage, said detecting means being coupled with said bus control unit for enabling access to said main storage and generating an input/output bus cycle signal for allowance of instruction execution of said slave microprocessor when said memory location required by said second decoded instruction for said slave microprocessor is physically present in said main storage and can be accessed, said detecting means operating to generate an interrupt to transfer programs and data from said external storage to said main storage when said memory location required by said second decoded instruction for said slave microprocessor is physically present in said main storage, and thereafter to generate said input/output bus cycle signal for allowance of instruction execution of said slave microprocessor.

said feedback means also including a third decoder receiving said input/output bus cycle signal for allowance of instruction execution of said slave microprocessor for generating an internal start signal to said second operation execution unit of said slave microprocessor so that said second operation execution unit of said slave microprocessor starts instruction execution only after said start signal is generated.

11. A microprocessor device as claimed in claim 10, wherein said detecting means comprises:

an effective address calculation unit coupled to said bus control unit and for calculating an effective address of a memory location required by a given instruction and executing a paging over check;

a memory management unit coupled to said effective address calculation unit and for mapping said memory location required by said given instruction into a physical address in said main memory or an I/O address.

12. A microprocessor device as claimed in claim 10, further comprising an address decoder provided externally of said master and slave microprocessors and coupled between said bus control unit and said slave microprocessor and for generating a select signal in response to a status of a signal outputted from said bus control unit.

13. A microprocessor device as claimed in claim 12, wherein said address decoder is configured to receive from said bus control unit a signal indicating an effective address of said main storage or an I/O address and output a select signal to said slave microprocessor in response to said I/O address.

14. A microprocessor device as claimed in claim 10, wherein said feedback means includes a command port coupled to said bus and operative to read said instructions for said slave microprocessor out of said bus in response to a control signal given by said master microprocessor, so that said second instruction decoder of said slave microprocessor receives an output of said command port and operates to decode only said instructions for said slave microprocessor; and wherein said feedback port is coupled to said second instruction decoder of said slave microprocessor to receive said second decoded instruction from said second instruction decoder for said slave microprocessor and operative to store an output of said second instruction decoder temporarily and feedback said stored output to said master microprocessor in response to a control signal given by said master microprocessor.

15. A microprocessor device as claimed in claim 14, wherein said third decoder of said feedback means is coupled to said address decoder and operative to decode a select signal and output control signals for controlling said slave microprocessor and said feedback means.

16. A microprocessor device as claimed in claim 15, wherein said control signals outputted from said decoder include:

said internal start signal to said second operation execution unit of said slave microprocessor;
a read control signal to said feedback port; and
a write control signal to said command port.

17. A microprocessor device as claimed in claim 10 wherein said master microprocessor is composed of a one-chip large scale integrated circuit in which said detecting means is incorporated.

18. A microprocessor device as claimed in claim 10 wherein said slave microprocessor is composed of a one-chip large scale integrated circuit in which said feedback means is incorporated.

19. A microprocessor device having a virtual storage system and comprising:

a master microprocessor,
a slave microprocessor being controlled by said master microprocessor to execute an operation of a portion of instruction sets,
a main storage for storing programs and data for said master microprocessor and said slave microprocessor,
an external storage coupled to said main storage for storing programs and data for said master microprocessor and said slave microprocessor, and
a bus coupling said master microprocessor, said slave microprocessor and said main storage to each other so as to transfer programs and data to each other;
said master microprocessor being composed of a one-chip large scale integrated circuit including:
a first instruction decoder to decode instructions for said master microprocessor and instructions for said slave microprocessor;
an effective address calculation unit being coupled to said instruction decoder and operative to execute address calculation from an output of said instruction decoder;
a memory management unit being coupled to said effective address calculating unit and operative to execute mapping a virtual address outputted by said effective address calculation unit into a real address and simultaneously execute a memory protection check;
an operation execution unit being coupled to said instruction decoder and operative to execute an operation designated by an instruction for said master microprocessor; and
a bus control unit being coupled to said bus and said memory management unit, and operative to output control signals;
an address decoder being provided externally of said master and slave microprocessors and coupled between said bus control unit and said slave microprocessor for generating a select signal in response to a status of a signal outputted from said bus control unit;
said slave microprocessor including:
a third decoder coupled to said address decoder and operative to decode said select signal and output a starting signal;
an operation execution unit coupled to said bus and connected at its input to an output of said third decoder and operative to execute an operation in response to said starting signal;
a command port coupled to said bus and operative to read an instruction for said slave microprocessor out of said bus in response to a control signal given by said third decoder;
a second instruction decoder coupled to said command port and operative to decode only an instruction for said slave microprocessor and output a second decoded instruction for said slave microprocessor; and
a feedback port coupled to said second instruction decoder and operative to respond to a control signal generated by said third decoder in response to a command from said master microprocessor, so as to temporarily store said second decoded instruction for said slave microprocessor output from said second instruction decoder including an address which is required for virtual memory management by said master microprocessor, said feedback port being coupled to said bus so that said bus control unit of said master microprocessor reads a content of said feedback port through said bus, whereby said effective address calculation unit and said memory management unit cooperate for detecting whether or not a memory location required by said second decoded instruction for said slave microprocessor is physically present in said main storage, and said bus control unit operating for enabling access of said main storage and generating an input/output bus cycle signal for allowance of instruction execution of said slave microprocessor when said memory location required by said second decoded instruction for said slave microprocessor is physically present in said main storage and can be accessed,
said bus control unit operating to generate an interrupt to transfer programs and data from said external storage to said main storage when said memory location required by said second decoded instruction for said processor is physically present in said main storage, and thereafter to generate said input/output bus cycle signal for allowance of instruction execution of said slave microprocessor, and said second address decoder receiving said input/output bus cycle signal for allowance of instruction execution of said slave microprocessor for generating said select signal and said second decoder of said slave microprocessor responding to said select signal to generate said start signal to said operation execution unit of said slave microprocessor so that said operation execution unit of said slave microprocessor starts its instruction execution only after said start signal is generated.

* * * * *